(12) United States Patent
Lee et al.

(10) Patent No.: US 10,093,754 B2
(45) Date of Patent: Oct. 9, 2018

(54) METHOD FOR PREPARING A SOLUTION OF A RARE-EARTH ALKYL PHOSPHATE

(71) Applicant: Korea Kumho Petrochemical Co., Ltd., Seoul (KR)

(72) Inventors: Hyung Jae Lee, Seoul (KR); Ji Hyun Heo, Seoul (KR)

(73) Assignee: Korea Kumho Petrochemical Co., Ltd., Seoul (KR)

(*) Notice: Subject to any disclaimer, the term of this patent is extended or adjusted under 35 U.S.C. 154(b) by 0 days.

(21) Appl. No.: 15/805,923

(22) Filed: Nov. 7, 2017

(65) Prior Publication Data

US 2018/0134818 A1 May 17, 2018

(30) Foreign Application Priority Data

Nov. 11, 2016 (KR) .................. 10-2016-0150104

(51) Int. Cl.
*C08F 4/68* (2006.01)
*C08F 4/629* (2006.01)

(52) U.S. Cl.
CPC .............. *C08F 4/68* (2013.01); *C08F 4/6297* (2013.01)

(58) Field of Classification Search
CPC ... C08F 4/68; C08F 4/6297; C07F 9/09; B01J 27/1804
USPC .................................................. 502/162, 208
See application file for complete search history.

(56) References Cited

U.S. PATENT DOCUMENTS

| | | | | | |
|---|---|---|---|---|---|
| 2,406,802 | A | * | 9/1946 | Carruthers | C07F 9/11 106/169.15 |
| 2,409,774 | A | * | 10/1946 | Mack | C07F 9/09 106/310 |
| 2,494,310 | A | * | 1/1950 | Plueddemann | C07F 9/025 203/33 |
| 2,656,372 | A | * | 10/1953 | Ernst | C11D 1/345 510/341 |
| 5,057,627 | A | | 10/1991 | Edwards | |
| 6,767,927 | B1 | * | 7/2004 | Yunlu | C07F 9/025 252/189 |

FOREIGN PATENT DOCUMENTS

SU 759522 * 8/1980 .............. C07F 9/09

* cited by examiner

*Primary Examiner* — Patricia L. Hailey
(74) *Attorney, Agent, or Firm* — Novick, Kim & Lee, PLLC; Jae Youn Kim

(57) ABSTRACT

Disclosed is a method of preparing a rare-earth alkyl phosphate solution, the method including step (a) of preparing an alkyl phosphate amine salt solution by reacting an organic amine with an alkyl phosphate in a first solvent; step (b) of preparing a rare-earth metal salt solution by reacting a rare-earth metal oxide with an acid in the second solvent; and step (c) of mixing and reacting the alkyl phosphate amine salt solution with the rare-earth metal salt solution.

20 Claims, No Drawings

METHOD FOR PREPARING A SOLUTION OF A RARE-EARTH ALKYL PHOSPHATE

CROSS-REFERENCE TO RELATED APPLICATION

This application claims priority to and the benefit of Korean Patent Application No. 10-2016-0150104, filed on Nov. 11, 2016, the disclosure of which is incorporated herein by reference in its entirety.

BACKGROUND

1. Field of the Invention

The present invention relates to a method of preparing a rare-earth alkyl phosphate solution.

2. Discussion of Related Art

As the demand for rubber compositions required for the production of tires, shoe soles, golf balls, and the like increases, while the production of natural rubber is insufficient, the value of conjugated diene-based polymers, especially butadiene-based polymers, which are synthetic rubbers capable of substituting for natural rubber, is increasing.

The linearity or branching of conjugated diene-based polymers greatly affects the physical properties of the polymers. Specifically, when the linearity of a polymer is low and the branching of the polymer is high, the dissolution rate of the polymer is increased and the viscosity is decreased and, as a result, the processability of the polymer is improved.

In general, transition metal catalysts are used to prepare a high-cis polybutadiene, but rare-earth catalysts are used to prepare rubber having excellent physical properties. Well known rare-earth catalysts include rare-earth alkyl carboxylic acids and rare-earth alkyl phosphates. Rare-earth alkyl carboxylic acid solutions are mainly used to prepare polybutadiene because of the low viscosity thereof.

Recently, rare-earth alkyl phosphates have been used in some cases to improve the physical properties of rubber. However, rare-earth alkyl phosphates have the low solubility in water and ordinary organic solvents, so that the aggregation easily occurs, thereby causing the precipitation problems. Since rare-earth alkyl phosphates have phosphorus (P) atom which considerably degrades the organic chemical properties of the molecules, the solubility of rare-earth alkyl phosphates in hydrocarbon solvents is lower than that of rare-earth alkyl carboxylic acids.

In U.S. Pat. No. 5,057,627, a method of preparing a rare-earth alkyl phosphate solution was disclosed. According to the method, the solution of rare-earth alkyl phosphate was prepared, in the presence of the organic solvent, by adding a rare-earth salt to a sodium alkyl phosphate, which prepared from sodium hydroxide and an alkyl phosphate. However, in this case, the rare-earth alkyl phosphate solution exists in the form of a gel having the very high viscosity, which is difficult to apply for the industry.

To solve this problem, in U.S. Pat. No. 6,767,927, the solution of rare-earth alkyl phosphate was prepared by adding a rare-earth nitrate to ammonium alkyl phosphate which prepared from aqueous ammonia solution and alkyl phosphate, and then a stabilizer is added thereto. In this case, the stabilizer remains in the rare-earth alkyl phosphate solution, stabilizing the solution of rare-earth alkyl phosphate for a while. However, before long, the layer separation between the organic solvent and the rare-earth alkyl phosphate occurs due to the stabilizer. As a result, when the rare-earth alkyl phosphate solution is used as a catalyst in polymer polymerization, the physical properties of the polymer are deteriorated.

SUMMARY OF THE INVENTION

Therefore, the present invention has been made in view of the above problems, and it is an objective of the present invention to provide a method of preparing a solution of rare-earth alkyl phosphate. According to the method of the present invention, the solution of rare-earth alkyl phosphate is possible to apply for the industry because the viscosity of the solution is kept low even after a long period of time has elapsed. In addition, since the layer separation phenomenon of the solution of rare-earth alkyl phosphate does not occur, storability is improved.

In accordance with the present invention, the above and other objectives can be accomplished by the provision of a method of preparing a rare-earth alkyl phosphate solution, the method including: step (a) of preparing an alkyl phosphate amine salt solution by reacting an organic amine with an alkyl phosphate in a first solvent; step (b) of preparing a rare-earth metal salt solution by reacting a rare-earth metal oxide with an acid in a second solvent; and step (c) of mixing and reacting the alkyl phosphate amine salt solution with the rare-earth metal salt solution.

In one embodiment, the organic amine may be one selected from the group consisting of methylamine, ethylamine, propylamine, butylamine, pentylamine, dimethylamine, diethylamine, dipropylamine, dibutylamine, trimethylamine, triethylamine, tripropylamine, tributylamine, piperidine, methylpiperidine, quinuclidine, pyridine and a mixture of two or more thereof.

In one embodiment, the alkyl phosphate may be bis(2-ethylhexyl) phosphate.

In one embodiment, the acid may be one selected from the group consisting of nitric acid, hydrochloric acid, sulfuric acid and a mixture of two or more thereof.

In one embodiment, each of the first and second solvents may be one selected from the group consisting of water, hexane, heptane, cyclohexane, methylcyclohexane and a mixture of two or more thereof.

In one embodiment, the rare-earth metal oxide may be one metal oxide selected from the group consisting of neodymium, lanthanum, praseodymium, samarium and cerium oxides.

In one embodiment, step (a) may be performed at 20 to 100° C.

In one embodiment, step (c) may be performed at 40 to 120° C.

In one embodiment, the organic amine may be used in an amount of 5 to 7 equivalents per 1 equivalent of the rare-earth metal oxide.

In one embodiment, the alkyl phosphate may be used in an amount of 5 to 7 equivalents per 1 equivalent of the rare-earth metal oxide.

In accordance with an aspect of the present invention, the above and other objectives can be accomplished by the provision of a method of preparing a rare-earth alkyl phosphate solution, the method including: step (a) of preparing an alkyl phosphate amine salt solution by reacting an organic amine with an alkyl phosphate in a solvent; and step (b) of mixing and reacting the alkyl phosphate amine salt solution with a rare-earth metal salt.

In one embodiment, the organic amine may be one selected from the group consisting of methylamine, ethylamine, propylamine, butylamine, pentylamine, dimethylamine, diethylamine, dipropylamine, dibutylamine, trimethylamine, triethylamine, tripropylamine, tributylamine, piperidine, methylpiperidine, quinuclidine, pyridine and a mixture of two or more thereof.

In one embodiment, the alkyl phosphate may be bis(2-ethylhexyl) phosphate.

In one embodiment, the rare-earth metal salt may be one selected from the group consisting of a rare-earth metal nitrate, hydrochloride, sulfate and a mixture of two or more thereof.

In one embodiment, the solvent may be one selected from the group consisting of water, hexane, heptane, cyclohexane, methylcyclohexane and a mixture of two or more thereof.

In one embodiment, the rare-earth metal salt may be one metal salt selected from the group consisting of neodymium, lanthanum, praseodymium, samarium and cerium salts.

In one embodiment, step (a) may be performed at 20 to 100° C.

In one embodiment, step (b) may be performed at 40 to 120° C.

In one embodiment, the organic amine may be used in an amount of 2.5 to 3.5 equivalents per 1 equivalent of the rare-earth metal salt.

In one embodiment, the alkyl phosphate may be used in an amount of 2.5 to 3.5 equivalents per 1 equivalent of the rare-earth metal salt.

DETAILED DESCRIPTION OF EXEMPLARY EMBODIMENTS

Hereinafter, the present invention is described in detail. The present invention may, however, be embodied in many different forms and should not be construed as limited to the embodiments described herein.

Throughout this specification, when a certain portion "includes" a component, it should be understood that, unless otherwise indicated, the portion may include other components without excluding other components.

According to one aspect of the present invention, the present invention provides a method of preparing a rare-earth alkyl phosphate solution, the method including: step (a) of preparing an alkyl phosphate amine salt solution by reacting an organic amine with an alkyl phosphate in a first solvent; step (b) of preparing a rare-earth metal salt solution by reacting a rare-earth metal oxide with an acid in a second solvent; and step (c) of mixing and reacting the alkyl phosphate amine salt solution with the rare-earth metal salt solution.

The organic amine may be one selected from the group consisting of methylamine, ethylamine, propylamine, butylamine, pentylamine, dimethylamine, diethylamine, dipropylamine, dibutylamine, trimethylamine, triethylamine, tripropylamine, tributylamine, piperidine, methylpiperidine, quinuclidine, pyridine and a mixture of two or more thereof, and is preferably a trialkylamine, such as trimethylamine, triethylamine, tripropylamine or tributylamine, without being limited thereto.

The alkyl phosphate may be bis(2-ethylhexyl) phosphate.

The acid may be one selected from the group consisting of nitric acid, hydrochloric acid, sulfuric acid and a mixture of two or more thereof, and is preferably nitric acid or sulfuric acid, without being limited thereto.

Each of the first and second solvents may be one selected from the group consisting of water, hexane, heptane, cyclohexane, methylcyclohexane and a mixture of two or more thereof. Specifically, the first solvent may be an organic solvent, as a reaction medium for an organic amine and an alkyl phosphate, selected from the group consisting of hexane, heptane, cyclohexane, methylcyclohexane and a mixture of two or more thereof. In addition, the second solvent may be a polar solvent, e.g., water, as a reaction medium for a rare-earth metal oxide and an acid, without being limited thereto.

The rare-earth metal oxide may be one metal oxide selected from the group consisting of neodymium, lanthanum, praseodymium, samarium and cerium oxides, and is preferably neodymium oxide, without being limited thereto.

Step (a) may be performed at 20 to 100° C., and is preferably performed at 40 to 80° C. A reaction time may be 1 to 6 hours, and is preferably 2 to 4 hours. In step (a), when the reaction temperature is lower than 20° C., the reaction may not occur sufficiently. On the other hand, when the reaction temperature exceeds 100° C., alkylamine evaporates before the reaction and thus the reduced amount of alkylamine leads to the incomplete reaction. In addition, when the reaction time in step (a) is less than 1 hour, the reaction may be incomplete. On the other hand, when the reaction time exceeds 6 hours, the reaction may be unnecessarily delayed and the efficiency may be lowered.

Step (c) may be performed at 40 to 120° C., and is preferably performed at 60 to 100° C. A reaction time may be 1 to 8 hours, and is preferably 3 to 6 hours. In step (c), when the reaction temperature is lower than 40° C., the reaction may not be complete. On the other hand, when the reaction temperature exceeds 120° C., the reaction efficiency may be lowered. In addition, when the reaction time in step (c) is less than 1 hour, the reaction may be incomplete. On the other hand, when the reaction time exceeds 8 hours, the reaction may be unnecessarily delayed and efficiency may be lowered.

The organic amine may be used in an amount of 5 to 7 equivalents per 1 equivalent of the rare-earth metal oxide, and is preferably used in an amount of 5.4 to 6.4 equivalents. When the amount of the organic amine is less than 5 equivalents with respect to 1 equivalent of the rare-earth metal oxide, the content of the rare-earth metal component in the rare-earth alkyl phosphate solution is decreased. On the other hand, when the amount of the organic amine exceeds 7 equivalents, the unnecessary precipitation may occur.

The alkyl phosphate may be used in an amount of 5 to 7 equivalents per 1 equivalent of the rare-earth metal oxide, and is preferably used in an amount of 5.4 to 6.4 equivalents. When the amount of the alkyl phosphate is less than 5 equivalents with respect to 1 equivalent of the rare-earth metal oxide, the content of the rare-earth metal component in the rare-earth alkyl phosphate solution is decreased. On the other hand, when the amount of the alkyl phosphate exceeds 7 equivalents, the physical properties of rubber produced using this ratio may be deteriorated.

In addition, after step (c), step (d1) of washing the product of step (c) may be further included. By performing step (d1), the concentration and purity of the rare-earth alkyl phosphate solution primarily prepared in step (c) may be increased. The washing may be performed using certain solvents. As usable solvents, water, an aqueous acetone solution or a mixture thereof may be used.

For example, when the washing is performed using an aqueous acetone solution as a solvent, the concentration of the aqueous acetone solution may be adjusted to 40% or less, and is preferably adjusted to 30% or less. When the concentration of the aqueous acetone solution exceeds 40%, the unnecessary precipitation may occur during washing.

In addition, after step (c), step (d2) of concentrating the product of step (c) may be further included. Concentration in step (d2) may be performed using a Dean-Stark apparatus. The concentration in step (d2) may be performed at a temperature of 100 to 170° C., and is preferably performed at 120 to 150° C. The concentration in step (d2) may be performed for 1 to 8 hours, and is preferably performed for 3 to 6 hours. When the concentration temperature in step (d2) is less than 100° C., the concentration may not be properly performed. On the other hand, when the temperature exceeds 170° C., the overall process efficiency may deteriorate.

Steps (d1) and (d2) may be alternatively performed, and when required, may be performed in combination with each other. In addition, when steps (d1) and (d2) are performed in combination with each other, steps (d1) and (d2) may be sequentially performed, and when required, steps (d2) and (d1) may be sequentially performed.

For example, the product of step (c) is washed once or more with a 30% aqueous acetone solution in step (d1), and the remaining aqueous acetone solution is removed using a Dean-Stark apparatus in step (d2). As a result, the concentration and the purity of the rare-earth alkyl phosphate solution primarily prepared in step (c) may be further increased.

In another aspect of the present invention, the present invention provides a method of preparing a rare-earth alkyl phosphate solution, the method including: step (a) of preparing an alkyl phosphate amine salt solution by reacting an organic amine with an alkyl phosphate in a solvent; and step (b) of mixing and reacting the alkyl phosphate amine salt solution with a rare-earth metal salt.

Unlike the above-described method, in the method of preparing a rare-earth alkyl phosphate solution, a step of preparing a rare-earth metal salt solution by reacting a rare-earth metal oxide with an acid in a solvent is omitted, and a certain rare-earth metal salt is directly mixed and reacted with the alkyl phosphate amine salt solution prepared in step (a).

In this case, since it is not necessary to prepare a separate rare-earth metal salt and an obtainable rare-earth metal salt may be immediately used, the efficiency and economic efficiency may be improved based on the advantage of raw material acquisition. For example, the rare-earth metal salt may be one selected from the group consisting of a rare-earth metal nitrate, hydrochloride, sulfate and a mixture of two or more thereof, and is preferably a rare-earth metal nitrate or sulfate, without being limited thereto.

The types of organic amines, alkyl phosphates and rare-earth metals that can be used and the reaction temperature and reaction time in each step are as described above.

The solvent may be one selected from the group consisting of water, hexane, heptane, cyclohexane, methylcyclohexane and a mixture of two or more thereof. Since the solvent acts as a reaction medium for an organic amine and an alkyl phosphate, the solvent is preferably one organic solvent selected from the group consisting of hexane, heptane, cyclohexane, methylcyclohexane and a mixture of two or more thereof.

The organic amine may be used in an amount of 2.5 to 3.5 equivalents per 1 equivalent of the rare-earth metal salt, and is preferably used in an amount of 2.7 to 3.2 equivalents. When the amount of the organic amine is less than 2.5 equivalents with respect to 1 equivalent of the rare-earth metal salt, the content of the rare-earth metal component in the rare-earth alkyl phosphate solution is decreased. On the other hand, when the amount exceeds 3.5 equivalents, the unnecessary precipitation may occur. The alkyl phosphate may be used in an amount of 2.5 to 3.5 equivalents per 1 equivalent of the rare-earth metal salt, and is preferably used in an amount of 2.7 to 3.2 equivalents. When the amount of the alkyl phosphate is less than 2.5 equivalents with respect to 1 equivalent of the rare-earth metal salt, the content of the rare-earth metal component in the rare-earth alkyl phosphate solution is decreased. On the other hand, when the amount exceeds 3.5 equivalents, the physical properties of rubber produced using this ratio may be deteriorated.

In addition, after step (b), step (d1) of washing the product of step (b) may be further included. By performing step (d1), the concentration and purity of the rare-earth alkyl phosphate solution primarily prepared in step (b) may be increased. The washing may be performed using certain solvents. As usable solvents, water, an aqueous acetone solution or a mixture thereof may be used.

For example, when the washing is performed using an aqueous acetone solution as a solvent, the concentration of the aqueous acetone solution may be adjusted to 40% or less, and is preferably adjusted to 30% or less. When the concentration of the aqueous acetone solution exceeds 40%, the unnecessary precipitation may occur during washing.

In addition, after step (b), step (d2) of concentrating the product of step (b) may be further included. The concentration in step (d2) may be performed using a Dean-Stark apparatus. The concentration in step (d2) may be performed at a temperature of 100 to 170° C., and is preferably performed at 120 to 150° C. The concentration in step (d2) may be performed for 1 to 8 hours, and is preferably performed for 3 to 6 hours. When the concentration temperature in step (d2) is less than 100° C., the concentration may not be properly performed. On the other hand, when the temperature exceeds 170° C., the overall process efficiency may deteriorate.

Steps (d1) and (d2) may be alternatively performed, and when required, may be performed in combination with each other. In addition, when steps (d1) and (d2) are performed in combination with each other, steps (d1) and (d2) may be sequentially performed, and when required, steps (d2) and (d1) may be sequentially performed.

For example, the product of step (b) is washed once or more with a 30% aqueous acetone solution in step (d1), and the remaining aqueous acetone solution is removed using a Dean-Stark apparatus in step (d2). As a result, the concentration and purity of the rare-earth alkyl phosphate solution primarily prepared in step (b) may be further increased.

Hereinafter, embodiments of the present invention are described in detail.

First Reaction: Preparation of Rare Earth Salt Solution 6 equivalents of an acid were added to a mixed liquid containing 1.68 g of a rare-earth metal oxide and 2 g of water, and a reaction mixture was allowed to proceed at a proper reaction temperature for 2 hours to obtain an aqueous rare-earth salt solution.

Second Reaction: Preparation of Alkyl Phosphate Amine Salt Solution 20 g of methylcyclohexane was added to a mixed liquid containing 9.6 g of bis(2-ethylhexyl) phosphate and 6.4 g of trimethylamine, and a reaction mixture was allowed to proceed at 80° C. for 1 hour to obtain a bis(2-ethylhexyl) phosphate amine salt solution.

Third Reaction: Preparation of Rare-Earth Alkyl Phosphate Solution

Examples 1 to 7

4.1 g of the aqueous rare-earth salt solution was added to 17 g of the bis(2-ethylhexyl) phosphate amine salt solution, the reaction mixture was stirred at 100° C. for 8 hours to obtain a product, and the product was washed three times with a washing solvent. The residual washing solvent was removed from the washed solution at 130° C. using a Dean-Stark apparatus, and a rare-earth alkyl phosphate solution was prepared. Materials used in the preparation and amounts thereof are shown in Table 1.

Comparative Examples 1 to 7

A rare-earth alkyl phosphate solution was prepared in the same manner as in Examples, except that material used in the preparation of the rare-earth alkyl phosphate solution and amounts thereof were changed according to the following Table 1.

TABLE 1

| Classification | Second reaction Base | Third reaction $NdX_3$ salt | Washing Solvent |
| --- | --- | --- | --- |
| Comparative Example 1 | NaOH | $NdCl_3$ | Water |
| Comparative Example 2 | KOH | $NdCl_3$ | Water |
| Comparative Example 3 | $Me_4NOH$ | $NdCl_3$ | Water |
| Comparative Example 4 | NaOH | $Nd(SO_4)_3$ | Water |
| Comparative Example 5 | NaOH | $Nd(NO_3)_3$ | Water |
| Comparative Example 6 | KOH | $Nd(NO_3)_3$ | Water |
| Comparative Example 7 | $NH_4OH$ | $Nd(NO_3)_3$ | Water |
| Example 1 | $Et_3N$ | $NdCl_3$ | Water |
| Example 2 | $Et_3N$ | $Nd(SO_4)_3$ | Water |
| Example 3 | $Me_3N$ | $Nd(NO_3)_3$ | Water |
| Example 4 | $Et_3N$ | $Nd(NO_3)_3$ | Water |
| Example 5 | $Me_3N$ | $Nd(NO_3)_3$ | 30% aqueous acetone solution |
| Example 6 | $Et_3N$ | $Nd(NO_3)_3$ | 30% aqueous acetone solution |
| Example 7 | Piperidine | $Nd(NO_3)_3$ | 30% aqueous acetone solution |

Experimental Example: Analysis of Solution Concentration, Solution Viscosity and Nd Content An appropriate amount of the rare-earth alkyl phosphate solution was injected into a total solid content (TSC) measuring apparatus, and the temperature of the solution was gradually raised from room temperature to 150° C. to measure the concentration of the rare-earth alkyl phosphate solution. In addition, an appropriate amount of the rare-earth alkyl phosphate solution was injected into a viscometer (Brookfield DV II+) and the solution viscosity was measured at room temperature.

In addition, an appropriate amount of the rare-earth alkyl phosphate solution was titrated with an aqueous ethylene diamine tetraacetic acid (EDTA) solution to analyze the content of neodymium (Nd) in the rare-earth alkyl phosphate solution, and the content of Nd in the rare-earth alkyl phosphate except for the solvent was calculated.

The concentration and viscosity of the rare-earth alkyl phosphate solution and the content of Nd, which were obtained by the above measurement and calculation, are shown in Table 2.

TABLE 2

| Classification | Solution concentration (%) | Solution viscosity (cps, 25° C.) | Content of Nd in rare-earth alkyl phosphate other than solvent (% by weight) |
| --- | --- | --- | --- |
| Comparative Example 1 | 23 | Not measurable | 11.3 |
| Comparative Example 2 | 27 | 591,000 | 10.3 |
| Comparative Example 3 | 15 | Not measurable | 10.5 |
| Comparative Example 4 | 27 | 1,250,000 | 10.7 |
| Comparative Example 5 | 19 | 338,000 | 11.5 |
| Comparative Example 6 | 28 | 18,016 | 11.4 |
| Comparative Example 7 | 25 | 8,818 | 11.9 |
| Example 1 | 26 | 65,152 | 11.6 |
| Example 2 | 27 | 139,681 | 11.2 |
| Example 3 | 37 | 725 | 11.8 |
| Example 4 | 37 | 970 | 11.6 |
| Example 5 | 45 | 130 | 12.2 |
| Example 6 | 56 | 514 | 12.3 |
| Example 7 | 40 | 1,031 | 12.1 |

When comparing the physical properties of the rare-earth alkylamine solutions of Example 1 and Comparative Example 1 using $NdCl_3$ salt in the third reaction with each other, the solution of Example 1 has a lower solution viscosity and a higher Nd content than the solution of Comparative Example 1. In addition, the physical properties of the solutions of Example 2 and Comparative Example 4 using $Nd(SO_4)_3$ salt in the third reaction show similar tendencies as above.

In addition, when $Nd(NO_3)_3$ salt is used in the third reaction, the solution viscosity of Example 4 using triethylamine ($Et_3N$) is lower than the solution viscosity of Comparative Examples 5 to 7 using NaOH, KOH, and $NH_4OH$ in the second reaction. In addition, in the same third reaction conditions, the solution of Example 5, in which trimethylamine ($Me_3N$) is used in the second reaction and washed with a 30% aqueous acetone solution, has a lower viscosity and a higher Nd content than the solution of Comparative Example 7, in which $NH_4OH$ is used and washed with water.

In particular, the solutions of Examples 5 and 6 have a lower viscosity and a higher Nd content than the solutions of Examples 3 and 4, in which only the washing solvent is replaced with water. These results indicate that, when the washing solvent contains a certain amount of acetone, it may be more efficient to wash free acids remaining in the reaction system.

As described above, the rare-earth alkyl phosphate solution prepared according to Examples is maintained in a stable state with a low viscosity for a long time without causing precipitation even after the preparation. Thus, the rare-earth alkyl phosphate solution may be industrially useful. In addition, a trialkylamine may be recycled by purification, thereby solving a problem of total nitrogen (T-N) concentration in wastewater, which is advantageous in term of economic efficiency.

In particular, the rare-earth alkyl phosphate solution prepared by the method may be used as a polymerization catalyst for synthetic rubber, and the synthetic rubber thus produced is excellent in physical properties and may be applied to tires, shoe soles, golf balls and the like.

The aforementioned description of the present invention is provided by way of example and those skilled in the art will understood that the present invention can be easily changed or modified into other specified forms without change or modification of the technical spirit or essential characteristics of the present invention. Therefore, it should be understood that the aforementioned examples are only provided by way of example and not provided to limit the present invention. For example, each of constituents described as a single form may be separately implemented and, similarly, constituents described as being separated may be implemented in a combined form.

It should be understood that the scope of the present invention is defined by the following claims and the invention is to cover all modifications, equivalents, and alternatives falling within the spirit and scope of the invention as defined by the claims.

According to one embodiment of the present invention, when an alkylamine is used in preparing a rare-earth alkyl phosphate solution, the viscosity of the solution can be kept low after a long period of time has elapsed, so that the processability can be improved, and a layer separation phenomenon can be suppressed and the storability can be improved.

In addition, the alkylamine can be recycled by distillation, thereby solving a problem of total nitrogen (T-N) concentration in wastewater, which is advantageous in term of economic efficiency.

It should be understood that the effects of the present invention are not limited to the effects described above, but include all effects that can be deduced from the description of the present invention or the composition of the invention described in the claims.

What is claimed is:

1. A method of preparing a rare-earth alkyl phosphate solution, the method comprising:
   preparing an alkyl phosphate amine salt solution by reacting an organic amine with an alkyl phosphate in a first solvent;
   preparing a rare-earth metal salt solution by reacting a rare-earth metal oxide with an acid in a second solvent; and
   mixing and reacting the alkyl phosphate amine salt solution with the rare-earth metal salt solution.

2. The method according to claim 1, wherein the organic amine is one selected from the group consisting of methylamine, ethylamine, propylamine, butylamine, pentylamine, dimethylamine, diethylamine, dipropylamine, dibutylamine, trimethylamine, triethylamine, tripropylamine, tributylamine, piperidine, methylpiperidine, quinuclidine, pyridine and a mixture of two or more thereof.

3. The method according to claim 1, wherein the alkyl phosphate is bis(2-ethylhexyl) phosphate.

4. The method according to claim 1, wherein the acid is one selected from the group consisting of nitric acid, hydrochloric acid, sulfuric acid and a mixture of two or more thereof.

5. The method according to claim 1, wherein each of the first and second solvents is one selected from the group consisting of water, hexane, heptane, cyclohexane, methylcyclohexane and a mixture of two or more thereof.

6. The method according to claim 1, wherein the rare-earth metal oxide is one metal oxide selected from the group consisting of neodymium, lanthanum, praseodymium, samarium and cerium oxides.

7. The method according to claim 1, wherein the preparing of an alkyl phosphate amine salt solution is performed at 20 to 100° C.

8. The method according to claim 1, wherein the mixing and reacting is performed at 40 to 120° C.

9. The method according to claim 1, wherein the organic amine is used in an amount of 5 to 7 equivalents per 1 equivalent of the rare-earth metal oxide.

10. The method according to claim 1, wherein the alkyl phosphate is used in an amount of 5 to 7 equivalents per 1 equivalent of the rare-earth metal oxide.

11. A method of preparing a rare-earth alkyl phosphate solution, comprising:
    preparing an alkyl phosphate amine salt solution by reacting an organic amine with an alkyl phosphate in a solvent; and
    mixing and reacting the alkyl phosphate amine salt solution with a rare-earth metal salt.

12. The method according to claim 11, wherein the organic amine is one selected from the group consisting of methylamine, ethylamine, propylamine, butylamine, pentylamine, dimethylamine, diethylamine, dipropylamine, dibutylamine, trimethylamine, triethylamine, tripropylamine, tributylamine, piperidine, methylpiperidine, quinuclidine, pyridine and a mixture of two or more thereof.

13. The method according to claim 11, wherein the alkyl phosphate is bis(2-ethylhexyl) phosphate.

14. The method according to claim 11, wherein the rare-earth metal salt is one selected from the group consisting of a rare-earth metal nitrate, hydrochloride, sulfate and a mixture of two or more thereof.

15. The method according to claim 11, wherein the solvent is one selected from the group consisting of water, hexane, heptane, cyclohexane, methylcyclohexane and a mixture of two or more thereof.

16. The method according to claim 11, wherein the rare-earth metal salt is one metal salt selected from the group consisting of neodymium, lanthanum, praseodymium, samarium and cerium salts.

17. The method according to claim 11, wherein the preparing is performed at 20 to 100° C.

18. The method according to claim 11, wherein the mixing and reacting is performed at 40 to 120° C.

19. The method according to claim 11, wherein the organic amine is used in an amount of 2.5 to 3.5 equivalents per 1 equivalent of the rare-earth metal salt.

20. The method according to claim 11, wherein the alkyl phosphate is used in an amount of 2.5 to 3.5 equivalents per 1 equivalent of the rare-earth metal salt.

* * * * *